(12) United States Patent
Boshra et al.

(10) Patent No.: US 9,576,126 B2
(45) Date of Patent: Feb. 21, 2017

(54) UPDATING A TEMPLATE FOR A BIOMETRIC RECOGNITION DEVICE

(71) Applicant: Apple Inc., Cupertino, CA (US)

(72) Inventors: Michael Boshra, Rockledge, FL (US); Pavel Mrazek, Prague (CZ); William M. Vieta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/180,334

(22) Filed: Feb. 13, 2014

(65) Prior Publication Data

US 2015/0227740 A1  Aug. 13, 2015

(51) Int. Cl.
*G06F 21/32* (2013.01)
*G06F 21/45* (2013.01)
*G06K 9/00* (2006.01)

(52) U.S. Cl.
CPC .............. *G06F 21/45* (2013.01); *G06F 21/32* (2013.01); *G06K 9/00926* (2013.01); *G06K 9/00013* (2013.01); *G06K 9/00087* (2013.01); *G06K 9/00885* (2013.01)

(58) Field of Classification Search
CPC . G06F 21/32; G06K 9/00087; G06K 9/00926; H04L 63/0861
See application file for complete search history.

(56) References Cited

U.S. PATENT DOCUMENTS

| | | | |
|---|---|---|---|
| 4,208,651 A | 6/1980 | McMahon | |
| 5,659,626 A | 8/1997 | Ort | |
| 5,799,098 A | 8/1998 | Ort | |
| 5,926,555 A | 7/1999 | Ort | |
| 5,982,914 A | 11/1999 | Lee et al. | |
| 5,999,098 A | 12/1999 | Lian | |
| 6,289,114 B1 | 9/2001 | Mainguet | |
| 6,323,846 B1 | 11/2001 | Westerman et al. | |
| 6,546,122 B1 | 4/2003 | Russo | |
| 6,570,557 B1 | 5/2003 | Westerman et al. | |
| 6,677,932 B1 | 1/2004 | Westerman | |
| 6,795,569 B1 | 9/2004 | Setlak | |
| 6,888,536 B2 | 5/2005 | Westerman et al. | |
| 6,898,301 B2 | 5/2005 | Iwanaga | |
| 6,950,540 B2 | 9/2005 | Higuchi | |
| 6,961,452 B2 | 11/2005 | Fujii | |

(Continued)

FOREIGN PATENT DOCUMENTS

| | | |
|---|---|---|
| CN | 101079087 | 3/2005 |
| EP | 1302907 | 4/2003 |

(Continued)

OTHER PUBLICATIONS

U.S. Appl. No. 14/243,858, filed Apr. 2, 2014, Han et al.

(Continued)

*Primary Examiner* — Linglan Edwards
(74) *Attorney, Agent, or Firm* — Brownstein Hyatt Farber Schreck, LLP

(57) ABSTRACT

A template of a biometric attribute for use with a biometric recognition device includes a long term component and a short term component. The long term component can include a plurality of nodes that each represents at least a portion of the biometric attribute. The short term component may include one or more newly captured nodes that each represents at least a portion of the biometric attribute.

14 Claims, 4 Drawing Sheets

(56) References Cited

U.S. PATENT DOCUMENTS

| | | | |
|---|---|---|---|
| 7,103,200 B2* | 9/2006 | Hillhouse | G06K 9/6255 382/115 |
| 7,194,116 B2 | 3/2007 | Du et al. | |
| 7,194,393 B2 | 3/2007 | Wei | |
| 7,280,677 B2 | 10/2007 | Chandler et al. | |
| 7,372,979 B2* | 5/2008 | Hillhouse | G06K 9/6255 382/115 |
| 7,512,571 B2 | 3/2009 | Rudolf | |
| 7,549,161 B2 | 6/2009 | Poo et al. | |
| 7,599,530 B2 | 10/2009 | Boshra | |
| 7,616,787 B2 | 11/2009 | Boshra | |
| 7,693,314 B2 | 4/2010 | Tykowski et al. | |
| 8,131,026 B2 | 3/2012 | Benkley et al. | |
| 8,255,699 B2* | 8/2012 | Tagscherer | G06K 9/00885 382/115 |
| 8,295,561 B2 | 10/2012 | Kwan | |
| 8,296,573 B2* | 10/2012 | Bolle | G06F 21/32 713/186 |
| 8,358,815 B2 | 1/2013 | Benkley et al. | |
| 8,482,381 B2 | 7/2013 | Chatterjee et al. | |
| 8,605,960 B2 | 12/2013 | Orsley | |
| 8,611,618 B2 | 12/2013 | Kwon et al. | |
| 8,736,421 B2* | 5/2014 | Abe | G06K 9/036 340/5.52 |
| 8,796,881 B2* | 8/2014 | Davis | B60L 11/1842 307/69 |
| 8,824,749 B2* | 9/2014 | Leyvand | G06K 9/00221 382/100 |
| 8,913,802 B2 | 12/2014 | Han et al. | |
| 9,239,944 B2* | 1/2016 | Abe | G06K 9/00087 |
| 2004/0146186 A1 | 7/2004 | Gelbord et al. | |
| 2007/0036400 A1 | 2/2007 | Watanabe | |
| 2007/0263912 A1 | 11/2007 | Biarnes et al. | |
| 2008/0155269 A1 | 6/2008 | Yoshikawa | |
| 2010/0054547 A1* | 3/2010 | Tagscherer | G06K 9/00885 382/115 |
| 2010/0182123 A1* | 7/2010 | Press | G07C 9/00158 340/5.28 |
| 2011/0044513 A1 | 2/2011 | McGonagle et al. | |
| 2012/0257797 A1* | 10/2012 | Leyvand | G06K 9/00221 382/118 |
| 2012/0319817 A1* | 12/2012 | Abe | G06K 9/036 340/5.82 |
| 2013/0064434 A1 | 3/2013 | Riopka et al. | |
| 2013/0207779 A1* | 8/2013 | Uno | G06K 9/00087 340/5.82 |
| 2013/0217409 A1* | 8/2013 | Bridges | B60L 11/1842 455/456.1 |
| 2013/0259330 A1* | 10/2013 | Russo et al. | 382/124 |
| 2013/0278383 A1 | 10/2013 | Boshra | |
| 2013/0279768 A1 | 10/2013 | Boshra | |
| 2013/0332354 A1 | 12/2013 | Rhee et al. | |
| 2014/0003678 A1 | 1/2014 | Vieta et al. | |
| 2014/0003679 A1 | 1/2014 | Han et al. | |
| 2014/0003681 A1 | 1/2014 | Wright et al. | |
| 2015/0139512 A1 | 5/2015 | Han et al. | |
| 2015/0278574 A1 | 10/2015 | Boshra | |
| 2015/0349959 A1 | 12/2015 | Marciniak | |

FOREIGN PATENT DOCUMENTS

| | | |
|---|---|---|
| EP | 1519326 | 3/2005 |
| EP | 1533759 | 5/2005 |
| TW | 201120763 | 6/2011 |

OTHER PUBLICATIONS

Cappelli, "SFinGe: an Approach to Synthetic Fingerprint Generation," DEIS, University of Bologna, Italy, 2004.

Nasser et al., "User Interface Design of the Interactive Fingerprint Recognition (INFIR) System," Proceedings of the 2006 International Conference on Security & Management, SAM 2006, Jun. 26, 2009, pp. 371-377, XP055084842, retrieved from the Internet on Oct. 22, 2013: URL:http://wwl.ucmss.com/books/LFS/CSREA2006/SAM8023.pdf.

Riley et al., "Instruction, Feedback and Biometrics: The User Interface for Fingerprint Authentication Systems," Human-Computer Interaction A Interact, 2009, Springer Berlin Heidelberg, pp. 293-305, XP019126310, ISBN: 978-3-642-03657-6.

Uz et al., "Minutiae-Based Template Synthesis and Matching Using Hierarchical Delaunay Triangulations," *Biometrics: Theory, Applications, and Systems*, 2007, First IEEE International Conference, Sep. 1, 2007, pp. 1-8, XP031189988, ISBN: 978-1-4244-1596-0, Section II, IV, V.

Anonymous, "WordPress › Limit Login Attempts < WordPress Plugins," Apr. 19, 2014, XP055202312, Retrieved from the Internet: URL:https://web.archive.org/web/20140419102326/http://wordpress.org/plugins/limit-login-attempts/screenshots/ [retrieved on Jul. 14, 2015], 3 pages.

Söderlund, "How do I best tell a user that his/her account will be locked if they enter the wrong credentials too many times?", Jul. 30, 2013, XP055202317, Retrieved from the Internet: URL:https://web.archive.org/web/20130730052456/http://us.stackexchange.com/questions/25621/how-do-i-best-tell-a-user-that-his-her-account-will-be-locked-if-they-enter-the [retrieved on Jul. 14, 2015], 3 pages.

Ryu et al., "Template Adaptation based Fingerprint Verification," Pattern Recognition, 2006, ICPR 2006, 18th International Conference on vol. 4, IEEE, 2006, 4 pages.

U.S. Appl. No. 13/802,645, filed Mar. 13, 2013, Vieta et al.
U.S. Appl. No. 13/802,695, filed Mar. 13, 2013, Han et al.
U.S. Appl. No. 13/841,287, filed Mar. 15, 2013, Wright et a.
U.S. Appl. No. 14/179,537, filed Feb. 12, 2014, Boshra.

* cited by examiner

UPDATING A TEMPLATE FOR A BIOMETRIC RECOGNITION DEVICE

TECHNICAL FIELD

The present invention relates generally to biometric recognition device, and more particularly to updating a biometric template for a biometric recognition device.

BACKGROUND

Biometric data generally holds a wealth of unique identifying information that may be used in a variety of different ways, with security applications being a common use of biometric data. This is due, in part to the fact that biometric data is not easily counterfeited and is uniquely associated with a person. Fingerprint and retina recognition devices, for example, are relatively common biometric data collecting devices that are used to collect biometric data for security purposes.

A common approach to fingerprint identification involves scanning a sample fingerprint or an image thereof and storing the image and/or unique characteristics of the fingerprint image. The characteristics of a sample fingerprint may be compared to information for reference or enrolled fingerprints already in a database to determine proper identification of a person, such as for verification purposes. In some instances, a fingerprint recognition device may scan only a section of a fingerprint. The fingerprint recognition device can collect the fingerprint image sections to form a template of the fingerprint. Some systems store multiple templates for each user to account for different fingerprints and variations in the fingerprints.

After a template is enrolled for a given user, however, the skin on a user's finger can change over time which can make it difficult to match newly captured fingerprint images (or fingerprint image sections) with the enrolled template. For example, a portion of the skin on a finger can develop a callus over time that adversely affects the fingerprint matching process. Depending on the size and thickness of the callus, the fingerprint recognition device may not be able to match a recently captured fingerprint image or fingerprint image section with the template for that finger. Alternatively, the skin on a user's finger may have a normal moisture level when the template for that finger is enrolled with the fingerprint recognition device. Over time, however, the user's skin may become drier, which can make it more difficult to match a newly captured fingerprint image with the enrolled template for that finger.

SUMMARY

Embodiments described herein provide a template for a biometric recognition device. In one aspect, a template of a biometric attribute can include a short term component and a long term component. The long term component can include a plurality of nodes that each represents a portion of the biometric attribute, such as a fingerprint. The short term component can include one or more recently captured nodes. In some embodiments, the short term component may be updated based on node information associated with each node. The node information can include information regarding the coverage area of the node, the matchability of the node, and/or the age of the node. The long term component may be updated based on the coverage area of a node. For example, if a node introduces or supplies new coverage area to the template, the node may be stored in the long term component.

In another aspect, an electronic device can include a biometric recognition device for capturing nodes that represent a biometric attribute, and a memory operatively connected to the biometric recognition device for storing one or more templates associated with the biometric attribute. At least one template includes a long term component comprising a plurality of nodes and a short term component comprising one or more recently captured nodes.

In yet another aspect, a method for updating a fingerprint template for a fingerprint recognition device may include receiving a newly captured node and determining if the newly captured node matches at least one node in a short term component and/or in a long term component of the fingerprint template, where the long term component includes a plurality of nodes and a short term component includes one or more recently captured nodes. If the newly captured node matches at least one node in the short term component and/or in the long term component of the fingerprint template, node information can be determined for the newly captured node. As one example, the node information may include at least one of the coverage area of the node, the matchability of the node, and the age of the node. A determination may be made as to whether or not the newly captured node is to be stored in the short term component. If so, the newly captured node is stored in the short term component. This determination can be based on a comparison of the node information associated with the newly captured node against the node information associated with the nodes currently stored in the short term component. A recently captured node may be removed from the short term component based on storing the newly captured node in the short term component. A determination of which node to remove may be based on a comparison of the node information associated with the nodes stored in the short term component. A determination can then be made as to whether or not the removed recently captured node is to be included in the long term component of the fingerprint template. This determination may be based on a coverage area of the removed node. For example, if a node introduces or supplies new coverage area to the template, the node may be stored in the long term component.

In another aspect, a method for updating a biometric template can include determining if a newly captured node that represents at least a portion of a biometric attribute matches at least one node in a short term component and/or in a long term component of the biometric template. The long term component may include a plurality of nodes and the short term component can include one or more recently captured nodes. If the newly captured node matches at least one node in the short term component and/or in the long term component, the newly captured node may be stored in at least one of the short term component and the long term component. The newly captured node may be stored in the short term component based on node information associated with the newly captured node. Additionally or alternatively, the newly captured node can be stored in the long term component based on a coverage area of the newly captured node. In some embodiments, the newly captured node is stored simultaneously in the short term component and in the long term component.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide a template for a biometric recognition device, such as a fingerprint recognition device, that includes a long term component and a short term component. The long term component can include one or more nodes and/or mosaics for the biometric attribute (e.g., fingerprint). The short term template component may include a certain number of recently captured nodes (e.g., the last five nodes captured by the biometric recognition device). The short term component may provide information on any changes in the biometric attribute and/or the current condition of the biometric attribute. In some embodiments, a recently captured node can be stored simultaneously in the short term and long term components. In other embodiments, a determination as to whether or not a node in the short term component should be included in the long term component can be made only when a node is removed from the short term component.

The example embodiments herein are described with reference to a fingerprint recognition device. Other embodiments, however, are not limited to this type of biometric recognition device. Embodiments of the present invention can be implemented with any biometric recognition device that collects nodes of biometric data as part of the enrollment and/or matching process.

Terms and phrases used herein are intended to be exemplary, not limiting in any way. Some examples of terms and phrases used herein include the following:

The term "node" generally refers to an individual portion, segment, or region of representation of a biometric attribute, or information representative thereof, such as might be collected by a biometric device. For example, the term "node" can refer to an image of an individual portion of a fingerprint as collected by a fingerprint recognition device.

The term "mosaic", and variants thereof, generally refers to a partially unified representation of a biometric attribute, or information representative thereof, collected from one or more nodes. For example, a mosaic can include a collection of nodes that are woven together or are adjacent to each other in a biometric attribute.

The text "template", and variants thereof, generally refers to multiple nodes and/or mosaics (or information representative thereof) that have been woven together and that have been validated as a biometric attribute. For example, a template can be constructed from one or more mosaics, or a mosaic and one or more additional nodes.

The term "biometric attribute" generally refers to any characteristic or trait of a user that can be captured by a biometric recognition device and used to identify or authenticate the identity of the user. For example, a biometric attribute can refer to a fingerprint, voice, iris, gait, vein pattern, and face of a user.

Figure 1:
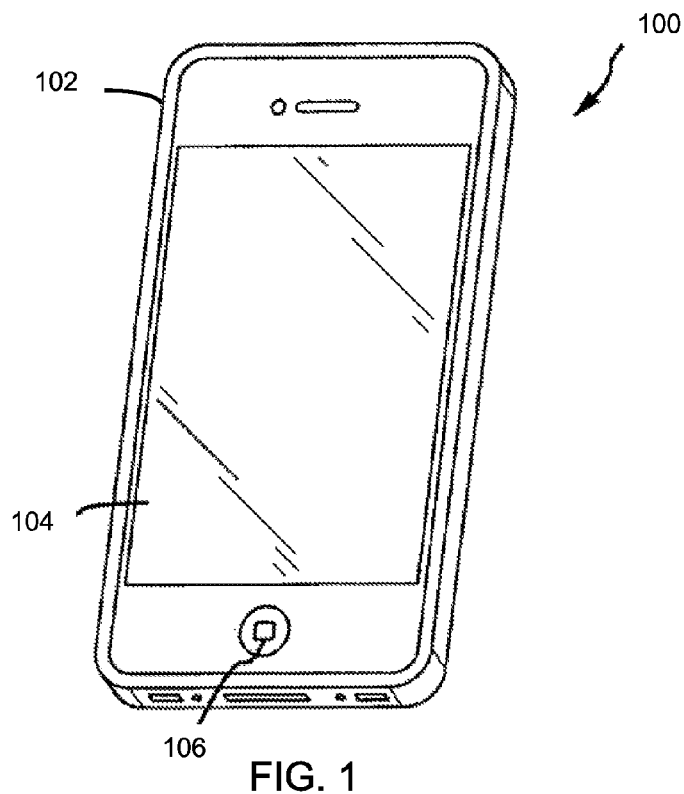
FIG. 1 is a perspective view of one example of an electronic device that can include, or be connected to, a biometric recognition system.

Referring now to FIG. 1, there is shown a perspective view of one example of an electronic device that can include, or be connected to a biometric recognition device. In the illustrated embodiment, the electronic device 100 is implemented as a smart telephone. Other embodiments can implement the electronic device differently, such as, for example, as a laptop or desktop computer, a tablet computing device, a gaming device, a display, a digital music player, a wearable communications device, a wearable health assistant, and other types of electronic devices that can acquire and/or receive biometric data from a biometric recognition device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

One or more biometric recognition devices can be included in, or connected to the electronic device 100. In one embodiment, the button 106 can include a biometric recognition device. As one example, a fingerprint recognition device can be integrated in the button 106. Additionally or alternatively, a biometric recognition device can be included in a portion of the display, or in the entire display. And in some embodiments, the enclosure 102 can include one or more biometric recognition devices, such as a fingerprint recognition device, a thermal recognition device, and a microphone that can be used in conjunction with a voice recognition application.

Figure 2:
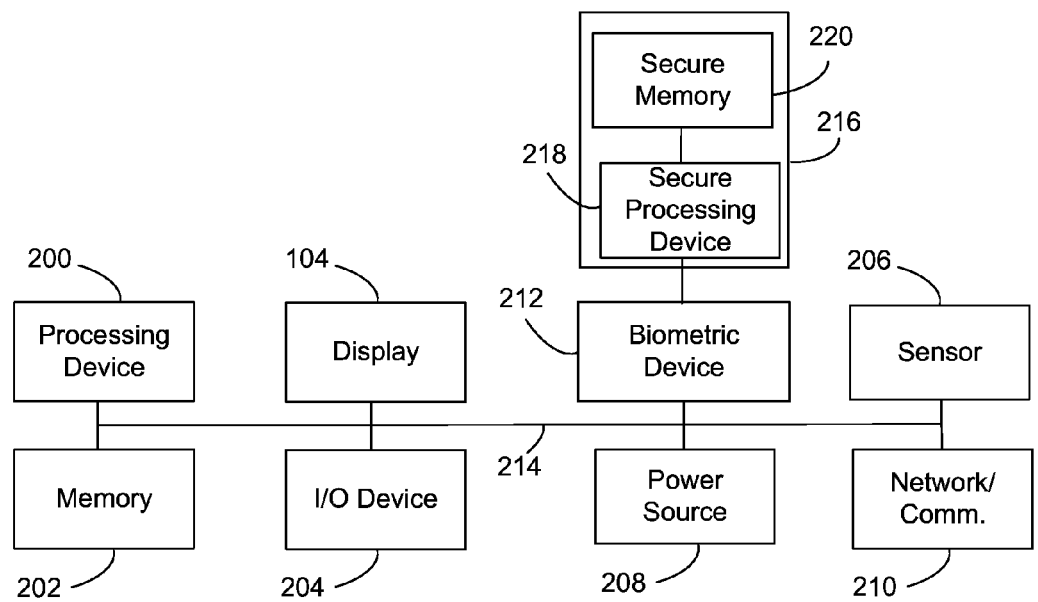
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, a network communications interface 210, and a biometric recognition device 212. The display 104 may provide an image or video output for the electronic device 100. The display may also provide an input region for one or more input devices, such as, for example, a touch sensing device and/or a fingerprint sensor. The display 104 may be substantially any size and may be positioned substantially anywhere on the electronic device 100.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the biometric recognition device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a track pad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, biometric data, and so on. For example, the sensor(s) 208 may be an image sensor, a heat sensor, a light or optical sensor, an accelerometer, a pressure transducer, a gyroscope, a magnet, a health monitoring sensor, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The biometric recognition device 212 can be implemented as any suitable biometric sensor, scanner, and/or system. For example, the biometric recognition device can be a facial recognition device, an iris or retina scanner, a vein recognition device that can image the veins in a finger or palm, a facial biometrics scanner, and/or a thermal imaging scanner. Additionally, the biometric recognition device 212 can be implemented with any suitable sensing technology, including, but not limited to, capacitive, resistive, ultrasound, piezoelectric, and thermal sensing technology.

The biometric recognition device 212 can be connected to a secure processing system 216. The secure processing system can be included in the electronic device, in the biometric recognition device, or in a separate electronic device that is operatively connected to the biometric recognition device 212. The secure processing system 216 may include a secure processing device 218 and a secure memory 220 operatively connected to the secure processing device 218. Any suitable processing device and memory can be used in the secure processing system 216. And in some embodiments, other components can be included in the secure processing system.

The secure processing system 216 can receive nodes captured by the biometric recognition device. The secure memory 220 may store the nodes, information associated with each node, and one or more templates. The secure processing device 218 can manipulate the secure data stored in the secure memory, including fingerprint images or fingerprint image sections, associated information, nodes, mosaics, and templates. The processing device 200 can be prohibited from accessing the fingerprint images received from the biometric recognition device and the secure data stored in the secure memory 220, which increases the security of the secure data. For example, the secure data is inaccessible or less accessible to other programs that may be running on the processing device 200.

It should be noted that FIGS. 1 and 2 are illustrative only. In other examples, an electronic device may include fewer or more components than those shown in FIGS. 1 and 2. For example, some of the components shown in FIG. 2 can be implemented in a separate electronic device that is operatively connected to the electronic device 100 through a wired or wireless connection. As described earlier, the secure processing system can be included in a separate electronic device. Additionally or alternatively, in some embodiments the display or at least one I/O device can be included in a separate electronic device.

In the example embodiments described hereafter, the biometric recognition device is implemented as a fingerprint recognition device. A fingerprint recognition device can capture images of one or more fingers, a portion of one or more fingers, and/or some or all of a palm or of a hand. In some embodiments, the fingerprint recognition device is positioned at a location that a user's finger, fingers and/or hands are naturally in contact with as the user interacts with the electronic device. For example, as described earlier, an electronic device can include a fingerprint recognition device in the display 104, the button 106, the enclosure 102, and/or as a separate electronic device that is connected to the electronic device 100. The phrase "fingerprint image" is meant to encompass generally one or more fingerprint images, fingerprint image sections, images of some or an entire palm or hand, and data structures that define the foregoing elements.

A fingerprint recognition device can receive fingerprint images associated with a user, collect nodes to produce a mosaic, collect mosaics to produce a template, and enroll that template in a database of fingerprint information. The fingerprint recognition device can determine new nodes, match those new nodes with the enrolled templates, and determine if those new nodes are also associated with that authorized user. The fingerprint recognition device may receive or capture fingerprint images during a user's operation of a device. For example, a fingerprint image may be captured as a user presses a button or interacts with a surface (such as a touch screen) overlaying the fingerprint recognition device, even if the interaction is not an express attempt to enroll a user. Continuing the example, the fingerprint recognition device may capture fingerprint images while a user plays a game on the electronic device, places a telephone call, or otherwise provides input to the electronic device. Such fingerprint images may be fragmentary portions of a fingerprint and an entire fingerprint may not be captured during a single user session. Accordingly, the fingerprint images or nodes may be stored for later processing in order to create a mosaic and/or a template of a fingerprint, which may then be enrolled with the device or otherwise registered by the device to provide authorization or access to particular functions.

In some embodiments, the fingerprint recognition device may be an array sensor that separately captures nodes of a fingerprint. Generally, there is some overlap between nodes representing adjacent portions of a fingerprint. Such overlap may assist in assembling the fingerprint from the nodes, and various image recognition techniques may be employed to use the overlap to properly identify and/or align adjacent nodes in the fingerprint.

Figure 3:
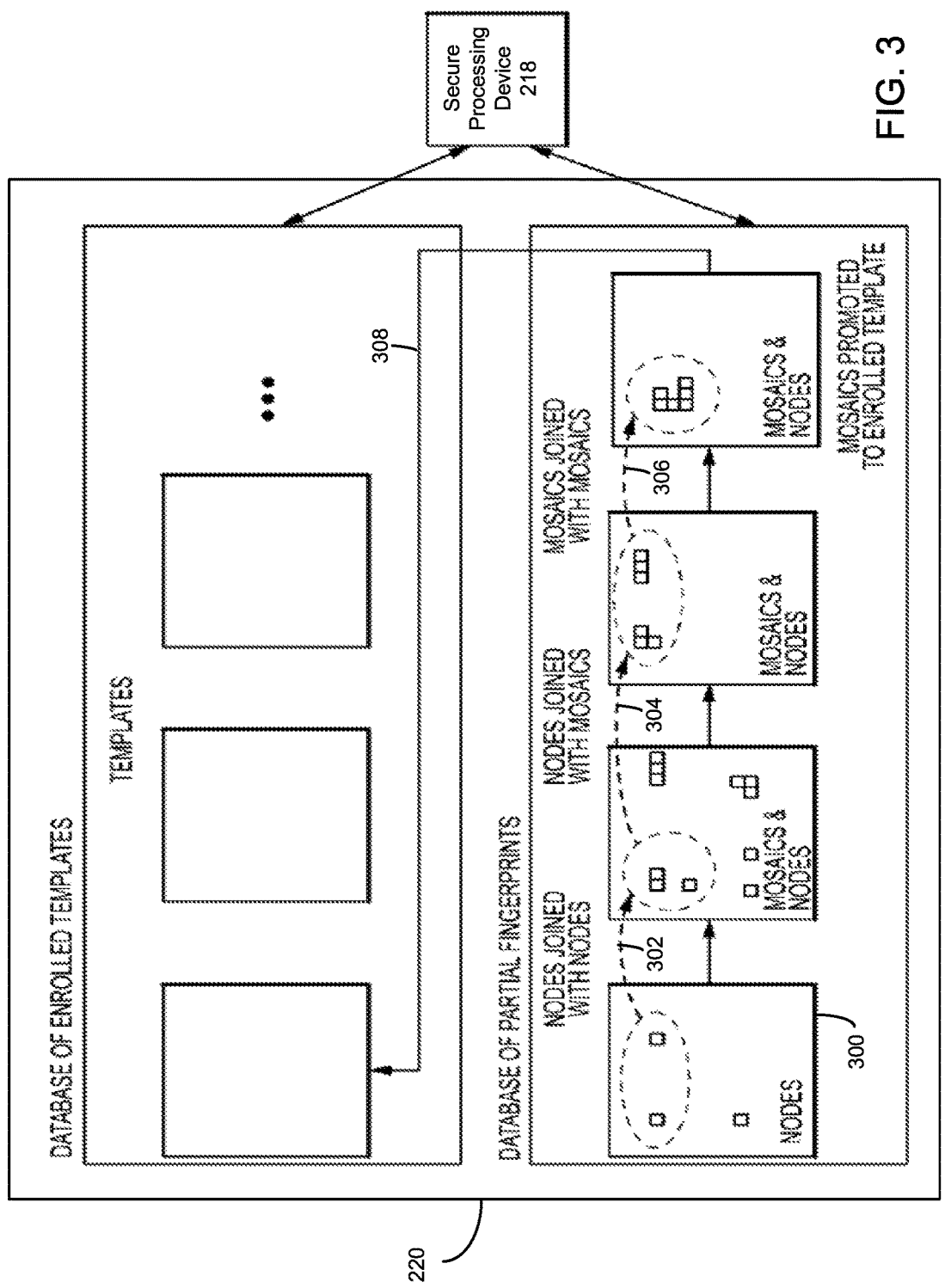
FIG. 3 is a conceptual drawing illustrating an example process of constructing a template for a fingerprint recognition device.

FIG. 3 is a conceptual drawing illustrating an example process of constructing a template for a fingerprint recognition device. Fingerprint data, including individual nodes, mosaics, and templates can be maintained in memory or storage and manipulated by a processing device (e.g., secure memory 220 and secure processing device 218 in FIG. 2). In one embodiment, each node can include a block of fingerprint data, which can be processed to determine information about that node. As will be described in more detail later, the node information can include information from which the fingerprint recognition device can determine whether that node can eventually be included in a template, and whether a template should be updated.

The fingerprint recognition device can capture and maintain nodes for one or more fingerprints. This is illustrated in block 300 in FIG. 3. In one embodiment, the captured nodes are stored in a database in a secure memory. The fingerprint recognition device can also construct and expand one or more mosaics for each fingerprint, where each mosaic includes a collection of nodes that the fingerprint recognition device has determined should be included in a template. For example, if a first node and a second node match, the fingerprint recognition device can collect those nodes into a mosaic (see 302 in FIG. 3). In a second example, if a node matches with any of the nodes in the mosaic, the fingerprint recognition device can collect that node with that mosaic and expand the mosaic to a larger mosaic (see 304). As a third example, if a first mosaic and a second mosaic include nodes which match, the fingerprint recognition device can collect those mosaics into a larger mosaic which includes the nodes from both of them (see 306). And in a fourth example, if a node matches with any of the nodes in both the first mosaic and the second mosaic, the fingerprint recognition device can collect those mosaics into a larger mosaic which includes the nodes from both of them, as well as the new node which matched both mosaics. This has the effect that, as nodes are discovered that match, they are collected into mosaics, the mosaics grow in size, and the mosaics can be collected into larger mosaics.

In some embodiments, the fingerprint recognition device can determine if and when a mosaic has sufficient information to comprise a template, so that the mosaic can be enrolled as a new template (see 308 in FIG. 3). If so, the fingerprint recognition can enroll the mosaic as a new template, associate that template with a user, and associate that template with appropriate credentials, such as those credentials afforded to that user. Templates can be associated with the same finger (e.g., same or different parts of the finger) and/or with different fingers.

In one embodiment, the mosaics and/or templates are a physical mosaics and templates. A physical mosaic can be constructed by aligning and stitching together multiple nodes of a fingerprint. A physical template can include a physical mosaic that is aligned and woven together with another mosaic or node.

Another embodiment can use logical mosaics and/or templates. Instead of physically stitching together given nodes, logical mosaics and templates store node information for each node in the mosaic and/or template. As one example, a logical mosaic and/or template can be constructed and/or configured as a biometric enrollment graph as disclosed in U.S. Pat. No. 7,616,787, which is herein incorporated by reference.

Node information can include information from which the fingerprint recognition device can use to make decisions regarding a respective node. For example, the fingerprint recognition device can determine whether a node can be included in a template, and/or information as to whether a node should be removed from a template. Additionally or alternatively, the node information can provide information from which the fingerprint recognition device can determine whether a template is to be updated. As one example, the node information can include information regarding the area coverage of a node. For example, the area coverage information can indicate how much area of the finger is represented in the node and/or how much additional coverage the node provides to a mosaic or template.

Additionally or alternatively, the node information can include information as to the matchability of the node. The matchability information can indicate number of attempted matches, the number of actual matches, and/or the last time a node was matched to another node. The matchability information of a node can have a global definition and a local definition. The global definition of matchability involves looking at all of the nodes in a template and assigning a score to one node's matchability compared to the matchability of the other nodes in the template. The local definition of matchability involves looking at a node and its bordering nodes and assigning a score to the one node based on the matchability score of the bordering nodes.

As described earlier, the skin on a user's finger can change over time which can make it difficult to match newly captured nodes with an enrolled template. As one example, a portion of the skin on a finger can develop a callus over time that adversely affects the fingerprint matching process. Depending on the size and thickness of the callus, the fingerprint recognition device may not be able to match a recently captured node with the template for that finger. Alternatively, the skin on a user's finger may have a normal moisture level when the template for that finger is enrolled with the fingerprint recognition device. Over time, however, the user's skin may become drier, which can make it more difficult to match a newly captured fingerprint node with the enrolled template for that finger.

To reduce the probability that a template will become stale or less useful, one or more newly captured nodes can be stored temporarily in a short term component of a template. The template may be stored in a long term component of the template. In some embodiments, the one or more newly captured nodes are recorded in the short term component regardless of whether a newly captured node is included in the long term component.

Figure 4:
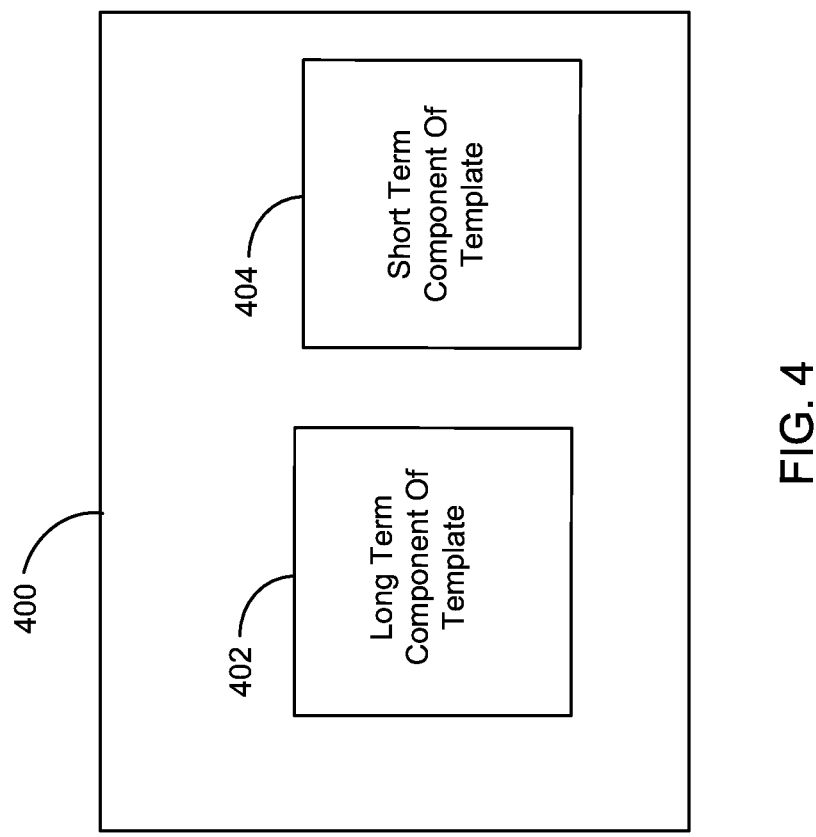
FIG. 4 is a block diagram of a template for a fingerprint recognition device.

FIG. 4 is a block diagram of a template for a fingerprint recognition device. The template 400 includes a long term component 402 and a short term component 404. The short term component 402 includes one or more nodes and/or mosaics that are associated with a finger or part of a finger of a user. Generally, a newly captured node is compared against at least one node as part of a matching operation.

Node information can also be included in the long term component 402. The node information can be stored with and/or logically represent a node. As described earlier, the node information can provide information on the area coverage, the matchability of the node, the entropy or amount of information in the node, the age of a node, and any other suitable information related to a node. In some embodiments, the age of each node may be represented by a timestamp indicating the time the node was first captured and/or how much time has passed since the node was last matched with a newly captured node. Additionally or alternatively, the timestamp can be implemented as absolute time or as a global counter of the number of nodes acquired by the fingerprint recognition device.

The short term component 404 can include one or more newly captured nodes. In one embodiment, the newly captured nodes that are stored in the short term component 404 can be a certain number of consecutively newly captured nodes, such as the last five nodes collected by the fingerprint recognition device. In another embodiment, the newly captured nodes can be a given number of recently captured nodes that match both the short and long term components of the template. The nodes in the short term component may provide information on any changes in the finger or skin and/or the current condition of the finger or skin.

Figure 5:
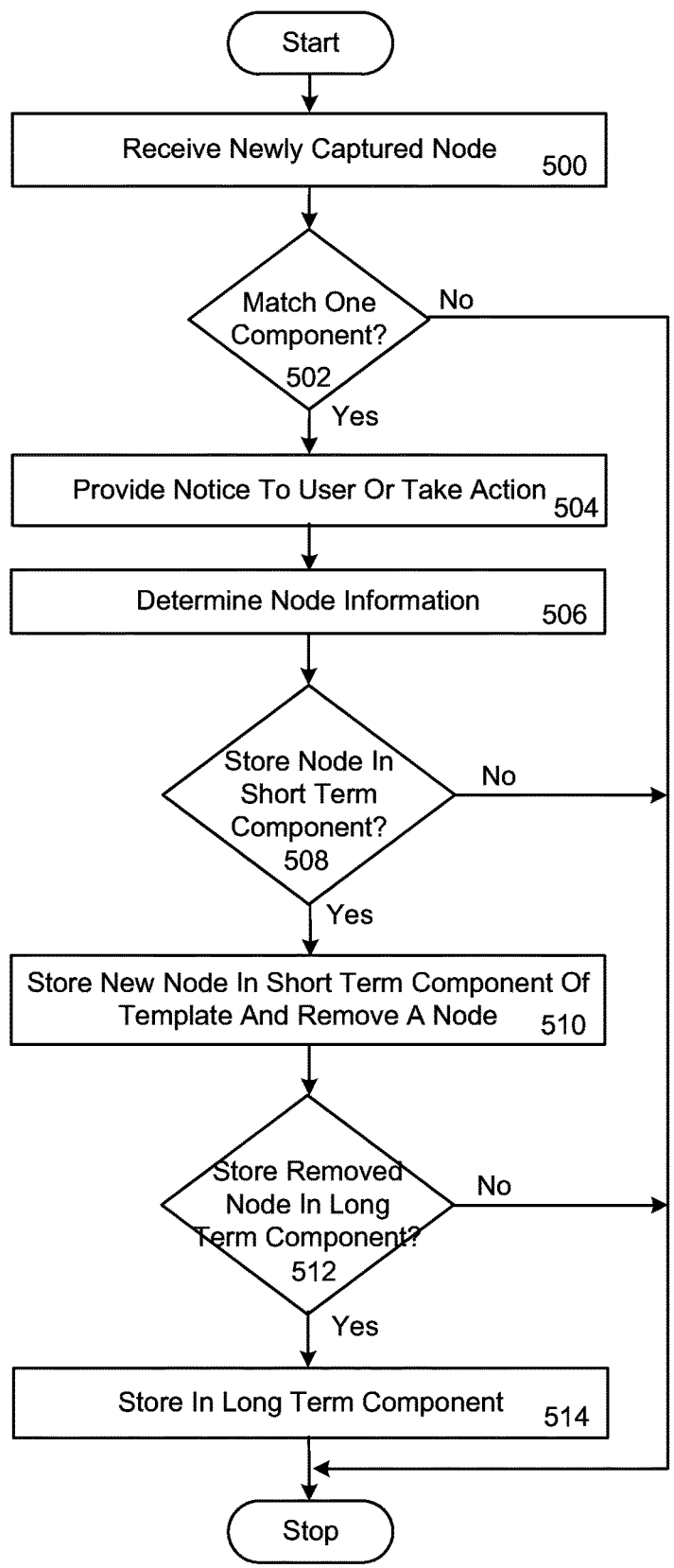
FIG. 5 is a flowchart of an example method for updating a template.

Referring now to FIG. 5, there is shown a flowchart of an example method for updating a template. Initially, a newly captured node is received at block 500. A determination may then be made at block 502 as to whether or not the newly captured node matches at least one node in the long term component of the template or in the short term component of the template, or in both the long term and short term components. The method ends if the newly captured node does not match at least one node in the short term component and in the long term component.

When a newly captured node matches one or more nodes in the short term component and/or in the long term component, the process continues at block 504 where a notice is provided to the user regarding the match and/or an action is taken based on the match (e.g., the user is provided access to an application). Node information can be determined for the newly captured node at block 506. In one embodiment, the node information includes information regarding the coverage area of the node, the matchability of the node, and/or the age of the node. The matchability can be local matchability information and/or global matchability information. Other embodiments can include additional information, less information, or different information in the node information. Any suitable information may be included in the node information. For example, information on the entropy of the node can be included in the node information.

Next, as shown in block 508, a determination may be made as to whether or not to store the newly captured node in the short term component of the template. The method ends if the newly captured node is not stored in the short term component. In one embodiment, the node information for the newly captured node is compared against the node information for the nodes currently stored in the short term component to determine if the newly captured node should replace a node currently stored in the short term component.

If the newly captured node is stored in the short term component, the method passes to block 510 where the newly captured node is stored in the short term component. In some embodiments, only a fixed number of nodes may be stored in the short term component. So when a newly captured node is added to the short term component, one of the nodes currently stored in the short term component must be removed. In one embodiment, the node to be removed is based on a comparison of the node information for the nodes.

Block 508 can be omitted in some embodiments, and each newly captured node may be automatically stored in the short term component. In these embodiments, the short term component can act as a first in, first out short term component, where the first node stored in the short term component is the first node removed from the short term component when a new node is to be stored in the short term component.

Next, as shown in block 512, a determination may be made as to whether or not the node removed from the short term component is to be added to the long term component of the template. This determination can be based on the amount of new coverage the node introduces or supplies to the long term template. For example, if the area of the fingerprint covered by the removed node is already present in the long term component, the removed node is not added to the long term component.

If the removed node is to be included in the long term component, the process continues at block 514 where the removed node is stored in the long term component. Alternatively, the method ends if the removed node is not included in the long term component.

Other embodiments can perform the method shown in FIG. 5 differently. Blocks can be omitted, re-arranged, and/or added to the process. For example, as described earlier, block 508 can be omitted in some embodiments. Additionally or alternatively, a newly captured node can be stored simultaneously in both the short term component and in the long term component. In such embodiments, the determination made at block 508 is whether or not the newly captured node should be stored in both the short term component and in the long term component. For example, a new node can be stored in the long term component when the newly captured node provides area coverage that is not currently included or covered in the long term component.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for updating a fingerprint template, comprising:
   receiving, from a fingerprint recognition device, a representation of a portion of a fingerprint;
   generating, by a processing device, a newly captured node based on the representation of the portion of the fingerprint;
   determining, by the processing device, if the newly captured node matches at least one node in at least one of a short term data structure and a separate long term data structure of the fingerprint template, wherein the long term data structure comprises a plurality of nodes that collectively form an enrolled fingerprint template and the short term data structure comprises one or more recently captured nodes that indicate a condition of a fingerprint associated with the fingerprint template;

if the newly captured node matches at least one node in at least one of the short term data structure or the long term data structure of the fingerprint template, storing, by the processing device, the newly captured node in the short term data structure;

removing, by the processing device, a recently captured node from the short term data structure;

determining, by the processing device, whether the removed recently captured node is to be included in the long term data structure of the fingerprint template; and storing, by the processing device, the removed recently captured node in the long term data structure.

2. The method as in claim 1, further comprising determining whether the newly captured node is to be stored in the short term data structure prior to storing the newly captured node in the short term data structure.

3. The method as in claim 2, further comprising determining node information for the newly captured node prior to determining whether the newly captured node is to be stored in the short term data structure.

4. The method as in claim 3, wherein the determination as to whether the newly captured node is to be stored in the short term data structure is based on the node information associated with the newly captured node.

5. The method as in claim 2, wherein the determination as to whether the removed recently captured node is to be included in the long term data structure is based on a coverage area of the recently captured node.

6. A method for updating a biometric template, comprising:

receiving, by a processing device, a newly captured node from a biometric recognition device operatively connected to the processing device, the newly captured node representing a portion of a biometric attribute;

determining, by the processing device, if the newly captured node matches at least one node in at least one of a short term data structure or a separate long term data structure of the biometric template, wherein the long term data structure of the biometric template comprises a plurality of nodes that collectively form an enrolled biometric template and the short term data structure of the biometric template comprises one or more recently captured nodes;

if the newly captured node matches at least one node in at least one of the short term data structure and the long term data structure of the biometric template, storing, by the processing device, the newly captured node in at least one of the short term data structure and the long term data structure of the biometric template, wherein the newly captured node is stored in the short term data structure based on node information associated with the newly captured node and the newly captured node is stored in the long term data structure based on a coverage area of the newly captured node;

receiving, by the processing device, biometric data captured by the biometric recognition device; and comparing, by the processing device, the captured biometric data to the updated biometric template to determine a match; wherein the node information associated with the newly captured node comprises at least one of coverage area, matchability, and age of the newly captured node.

7. The method as in claim 6, further comprising removing a recently captured node from the short term data structure of the biometric template.

8. The method as in claim 7, wherein a recently captured node is removed from the short term data structure of the biometric template based on the node information associated with the node.

9. An electronic device, comprising:

a biometric recognition device configured to capture one or more nodes representing at least a first portion of a biometric attribute;

a processing device; and a memory storing a biometric template of the biometric attribute and operatively coupled to the biometric recognition device and the processing device, the biometric template comprising:

a long term data structure comprising a plurality of nodes previously captured by the biometric recognition device, each representing at least a second portion of the biometric attribute; and a short term data structure comprising the one or more nodes captured by the biometric recognition device, the one or more nodes providing information on a condition of the biometric attribute; wherein:

the short term data structure and the long term data structure are both stored as part of the biometric template;

the processing device is configured to:

update the long term data structure based on the one or more nodes indicating a change in the biometric attribute, thereby updating the biometric template to an updated biometric template;

receive further biometric data from the biometric recognition device; and compare the further biometric data to the updated biometric template to determine if the two match; and compare the further biometric data to at least one of the plurality of nodes stored in the long term data structure and at least one of the one or more nodes stored in the short term data structure; and the information provided by the one or more nodes comprises information regarding at least one of coverage area, matchability, and an age of each node.

10. The electronic device of claim 9, wherein the biometric template comprises a fingerprint template.

11. The electronic device as in claim 9, wherein the processing device comprises a secure processing device.

12. The electronic device as in claim 9, wherein the biometric recognition device comprises a fingerprint recognition device and the biometric attribute comprises at least a portion of a fingerprint.

13. The electronic device as in claim 9, wherein the memory comprises a secure memory.

14. The electronic device as in claim 9, wherein the electronic device is a smart telephone.

* * * * *